(12) United States Patent
Dutta et al.

(10) Patent No.: US 12,525,149 B2
(45) Date of Patent: Jan. 13, 2026

(54) GROUND BASED AIRCRAFT WING AND NACELLE MOCKUP DESIGN FOR TRAINING

(71) Applicant: The Boeing Company, Chicago, IL (US)

(72) Inventors: Sujib Dutta, Bengaluru (IN); James John, Bengaluru (IN); Jaspreet Singh, Bengaluru (IN)

(73) Assignee: The Boeing Company, Chicago, IL (US)

( * ) Notice: Subject to any disclaimer, the term of this patent is extended or adjusted under 35 U.S.C. 154(b) by 965 days.

(21) Appl. No.: 17/656,535

(22) Filed: Mar. 25, 2022

(65) Prior Publication Data

US 2023/0306877 A1 Sep. 28, 2023

(51) Int. Cl.
*G09B 25/02* (2006.01)
*B64F 5/40* (2017.01)
*B64F 5/60* (2017.01)

(52) U.S. Cl.
CPC .............. *G09B 25/02* (2013.01); *B64F 5/40* (2017.01); *B64F 5/60* (2017.01)

(58) Field of Classification Search
CPC .......... G09B 25/02; G09B 9/08; G09B 19/00; B64F 5/40; B64F 5/60
See application file for complete search history.

(56) References Cited

U.S. PATENT DOCUMENTS

| | | | | |
|---|---|---|---|---|
| 1,912,174 | A * | 5/1933 | Bisch ....................... | G09B 9/12 472/27 |
| 5,009,598 | A * | 4/1991 | Bennington ............. | G09B 9/10 434/48 |
| 6,360,381 | B1 * | 3/2002 | Fitzgerald, Sr. ...... | E03D 11/143 248/68.1 |
| 2014/0110526 | A1 * | 4/2014 | De Azevedo ............ | B64C 1/36 244/118.1 |

(Continued)

FOREIGN PATENT DOCUMENTS

| CN | 206167907 U | * | 5/2017 |
|---|---|---|---|
| CN | 108630055 A | | 10/2018 |

(Continued)

OTHER PUBLICATIONS

Dietz. "Unsteady Wing-Pylon-Nacelle Interference in Transonic Flow." May-Jun. 2008. Journal of Aircraft, vol. 45, No. 3 (Year: 2008).*

(Continued)

*Primary Examiner* — Dmitry Suhol
*Assistant Examiner* — Julie Grace Dosher
(74) *Attorney, Agent, or Firm* — Yee & Associates, P.C.

(57) ABSTRACT

A ground-based wing mockup station is provided. The mockup station comprises a primary support structure removably coupled to a floor and a wing mockup coupled to the primary support structure. A secondary support structure configured to suspend the wing mockup over the floor from the primary support structure. A payload pylon mockup is coupled to the wing mockup, wherein the payload pylon (Continued)

mockup is configured to hold an apparatus. The primary support structure, secondary support structure, wing mockup, and payload pylon mockup are configured to support a weight at least equal to the apparatus.

20 Claims, 8 Drawing Sheets

(56) References Cited

U.S. PATENT DOCUMENTS

| | | | |
|---|---|---|---|
| 2019/0061966 A1 | 2/2019 | West | |
| 2022/0002002 A1* | 1/2022 | Flood | B24C 1/04 |
| 2022/0145809 A1* | 5/2022 | Hallisey | F02C 7/12 |
| 2022/0362856 A1* | 11/2022 | Suchel | G06F 30/15 |

FOREIGN PATENT DOCUMENTS

| | | | |
|---|---|---|---|
| KR | 20190094783 A | | 8/2019 |
| KR | 102151485 | * | 9/2020 |
| RU | 2271305 C1 | * | 3/2006 |
| RU | 2607675 C1 | * | 1/2017 |

OTHER PUBLICATIONS

European Patent Office Extended Search Report and Written Opinion, dated Jul. 7, 2023, regarding Application No. EP23161806.7, 6 pages.

* cited by examiner

GROUND BASED AIRCRAFT WING AND NACELLE MOCKUP DESIGN FOR TRAINING

BACKGROUND INFORMATION

1. Field

The present disclosure relates generally to aircraft, more specifically, to a physical ground-based wing mockup for training ground personnel.

2. Background

Maintenance personnel for aircraft are often trained using physical mockup stations of an aircraft or select sections of an aircraft. Such mockups allow the maintenance personnel to become familiar with the aircraft components on which the personnel will work after training. The mockups also provide experience working within the space constraints and around obstacles associated with the aircraft or aircraft sections in question. Examples, include wings and engine nacelles. Often, the training mockups employ scrap aircraft sections which require significant modification for use as training simulators.

Therefore, it would be desirable to have a method and apparatus that take into account at least some of the issues discussed above, as well as other possible issues.

SUMMARY

An illustrative embodiment provides a ground-based wing mockup station. The mockup station comprises a primary support structure removably coupled to a floor and a wing mockup coupled to the primary support structure. A secondary support structure configured to suspend the wing mockup over the floor from the primary support structure. A payload pylon mockup is coupled to the wing mockup, wherein the payload pylon mockup is configured to hold an apparatus. The primary support structure, secondary support structure, wing mockup, and payload pylon mockup are configured to support a weight at least equal to the apparatus.

Another illustrative embodiment provides an aircraft wing mockup training station. The training station comprises a support structure comprising steel beams configured to be removably connected to a floor. An aircraft wing mockup is coupled to the support structure and suspended over the floor. The aircraft wing mockup comprises an aluminum center wing section, an aluminum trailing edge subassembly, and an ABS plastic leading edge subassembly that is additively manufactured. A polyurethane foam nacelle pylon mockup is coupled to the aircraft wing mockup, and a polyurethane foam nacelle mockup is coupled to the nacelle pylon mockup. An aluminum payload pylon mockup is coupled to the aircraft wing mockup and is configured to hold a device, wherein the support structure, aircraft wing mockup, and payload pylon mockup are configured to hold a weight load at least equal to the device.

Another illustrative embodiment provides a ground-based aircraft wing mockup station. The mockup station comprises a support structure configured to be removably coupled to a floor. A wing mockup of a production aircraft wing is coupled to the support structure and suspended over the floor. The wing mockup comprises parts made of lighter materials than corresponding parts of the production aircraft wing. The parts comprising the wing mockup are a subset of the corresponding parts of the production aircraft wing. A nacelle pylon mockup is coupled to the wing mockup, and a nacelle mockup is mounted to the nacelle pylon mockup, wherein the engine nacelle mockup is made of lighter material than a real nacelle. A payload pylon mockup is coupled to the wing mockup. The payload pylon mockup is configured to hold specified equipment, and wherein the support structure, the wing mockup, and the payload pylon mockup are configured to hold a weight load at least equal to the specified equipment The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that aircraft training mockups often employ scrap aircraft sections such as wings and engine nacelles. Existing aircraft wings designs are complex and expensive to use for training purposes and require critical modifications of the structures in order to install them on a training floor.

The illustrative embodiments also recognize and take into account that support structure design is complicated if using actual aircraft wings for training. Therefore, actual/scrap aircraft wings cannot be uses as is for training purposes due to heavy weight.

The illustrative embodiments also recognize and take into account that heavier actual aircraft structures required for flight loads are not practical and not necessary to use in ground-based training environments.

The illustrative embodiments also recognize and take into account that currently there are no mobile support structure readily available to install an aircraft wing in a cantilever form.

The illustrative embodiments provide a mockup aircraft wing training station which replicates an actual aircraft wing and payload pylon. The mockup is configured to fasten to a facility floor with removable anchor bolts so that it can be easily relocated. The mockup employs additively manufactured (3-D printed) plastic and polyurethane foam materials to maintain the visual appearance of the actual aircraft wing while reducing structural complexity and weight.

Figure 1:
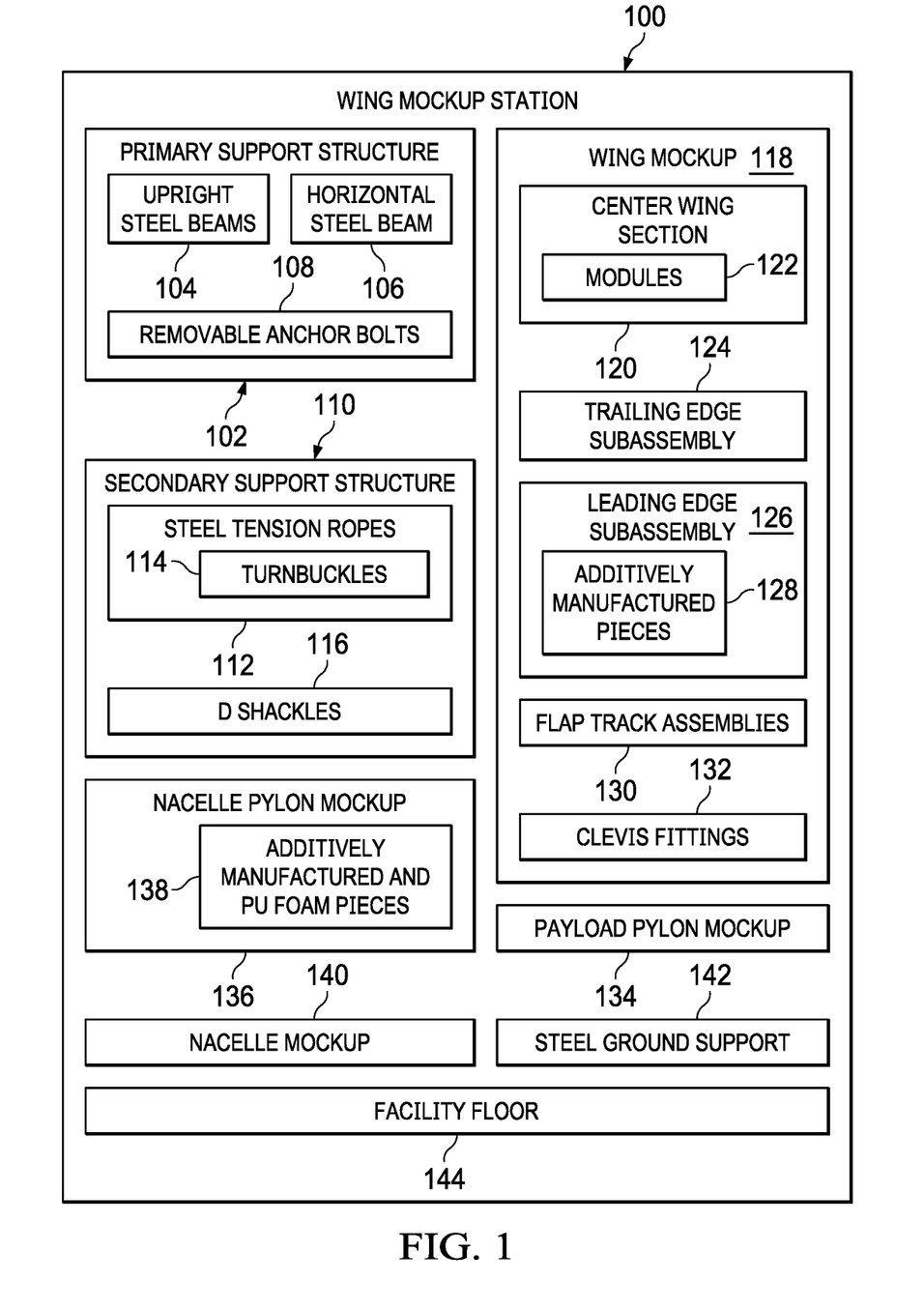
FIG. 1 depicts a block diagram illustrating a wing mockup station in accordance with an illustrative embodiment.

FIG. 1 depicts a block diagram illustrating a wing mockup station in accordance with an illustrative embodiment. Wing mockup station 100 comprises primary support structure 102 and secondary support structure 110 which suspend wing mockup 118 over a facility floor 144.

Primary support structure 102 comprises a pair of upright steels beams 104 and a horizontal steel beam 106. Removable anchor bolts 108 connect upright steel beams 104 to facility floor 144.

Secondary support structure 110 comprises a number of steel tension ropes 112 that suspend wing mockup 118 from the primary support structure 102 as well as connect the primary support structure 102 to the facility floor 144. The steel tension ropes 112 may comprise turnbuckles 114 at the proximal ends and are secured to the wing mockup 118 and facility floor 144 by D shackles 116 at the distal ends.

Wing mockup 118 comprises a center wing section 120, trailing edge subassembly 124, and leading edge subassembly 126. The center wing section 120 may comprise a number of modules 122. Similarly, leading edge subassembly 126 may comprise a number of pieces made of additively manufactured (3-D printed) plastic 128. Wing mockup 118 also comprises a number of flap track assemblies 130. Clevis fittings 132 connect the horizontal steel beam 106 to wing mockup 118.

Wing mockup station 100 also comprises a nacelle pylon mockup 136 connected to wing mockup 118. The nacelle pylon mockup 136 may comprise a number of additively manufactured plastic and/or polyurethane foam pieces 138. A nacelle mockup 140 made of polyurethane foam is mounted on the nacelle pylon mockup 136 and may be supported by a steel ground support 142.

Payload pylon mockup 134 is also connected to wing mockup 118. This payload pylon mockup 134 may be configured to support specific types of equipment such as sensor packages, external fuel tanks, propulsion systems, and other that may be mounted on the aircraft wing simulated by wing mockup 118. Payload pylon mockup 134 can be used by ground maintenance personnel to practice mounting and dismounted equipment from the wing.

Figure 2:
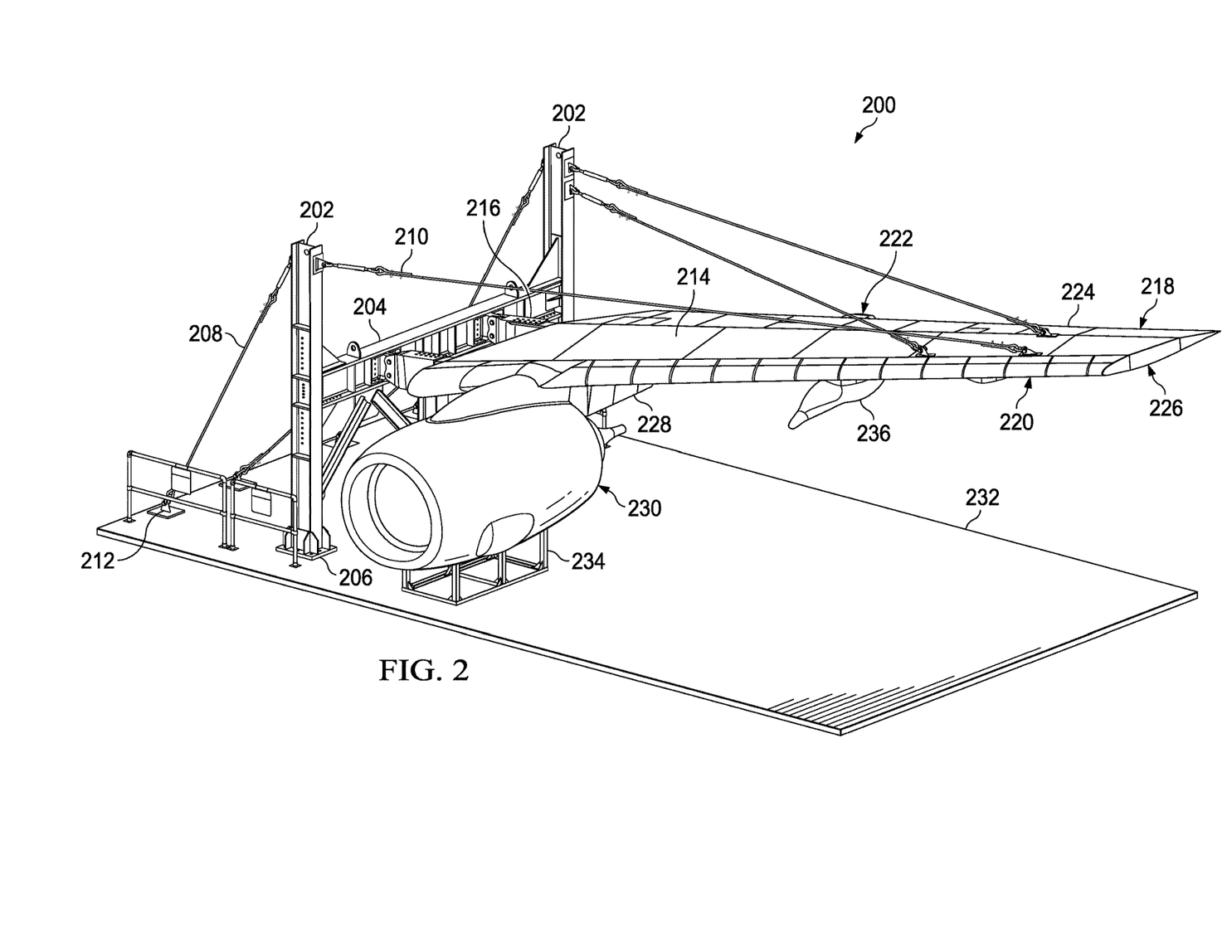
FIG. 2 depicts a perspective view diagram illustrating a ground-based wing mockup station in accordance with an illustrative embodiment.
Figure 3:
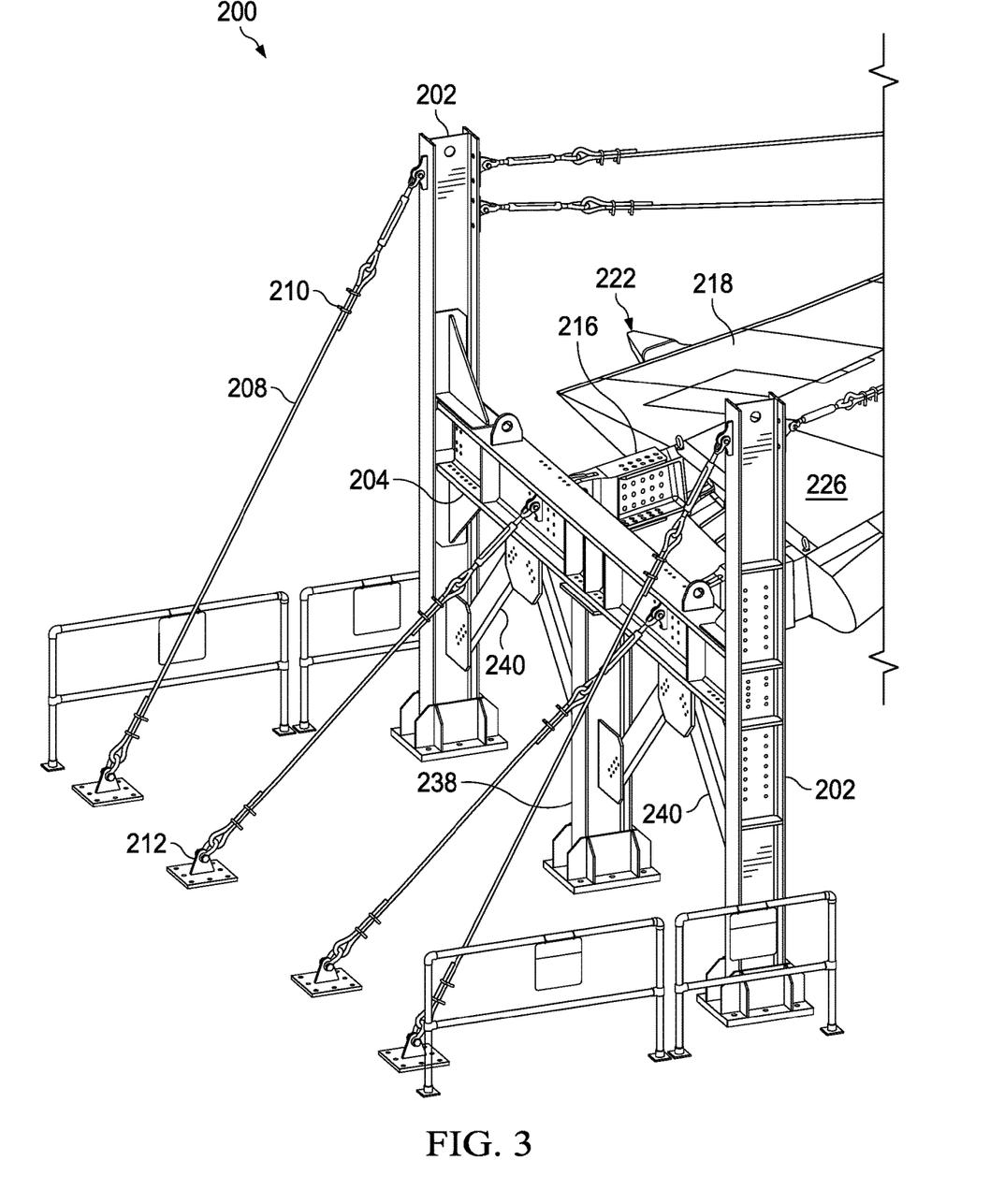
FIG. 3 depicts a reverse perspective view of the primary and secondary support structures of the wing mockup station in accordance with an illustrative embodiment.

FIG. 2 depicts a perspective view diagram illustrating a ground-based wing mockup station in accordance with an illustrative embodiment. FIG. 3 depicts a reverse perspective view of the primary and secondary support structures of the wing mockup station. Wing mockup station 200 is an example implementation of wing mockup station 100 in FIG. 1.

Wing mockup station 200 comprises a primary support structure removably coupled to a facility floor 232 and a wing mockup 214 coupled to the primary support structure. The primary support structure comprises two upright steel beams 202 and a horizontal steel beam 204 connecting the upright steel beams. The upright steel beams 202 are fastened to the facility floor 232 by removable anchor bolts through baseplates 206 of the upright steel beams 202. A third upright steel beam 238 may also support the center of horizontal beam 204 (shown most clearly in FIG. 3). Upright steel beams 202, 238 and horizontal steel beam 204 may be further supported by trusses 240.

A secondary support structure suspends the wing mockup 214 over the facility floor 232 from the primary support structure. The secondary support structure comprises a number of steel tension ropes 208 connecting the upright steel beams 202 to the wing mockup 214 via turnbuckles 210 and connecting the upright steel beams 202 and horizontal beam 204 to the facility floor 232 via baseplates 212.

Wing mockup 214 simulates a production aircraft wing but comprises parts made of lighter materials than the corresponding parts of the production aircraft wing. The parts comprising the wing mockup 214 may be a subset of the corresponding parts of the production aircraft wing, thereby making wing mockup 214 less complex and lighter than the corresponding real production wing simulated by the mockup. Wing mockup 214 may comprise a center wing section 226 made of aluminum, a trailing edge subassembly 218 made of aluminum, and a leading edge subassembly 220 made of acrylonitrile butadiene styrene (ABS) plastics. A number of double shear clevis fittings 216 may connect the proximal end of the wing mockup 214 to the horizontal steel beam 204. The wing mockup 214 further comprises a number of flap track assemblies 222 that may be made of aluminum. Wing mockup 214 may also comprise a skin air vehicle presentation (AVR) 224.

A payload pylon mockup 236 configured to hold an apparatus is coupled to the wing mockup 214. The payload pylon 236 may be made of machined aluminum and configured to hold a specified piece of equipment such as a sensor package, external fuel tank, etc. that ground maintenance personnel can practice loading and unloading from the payload pylon 236. The primary support structure, secondary support structure, wing mockup 214, and payload pylon mockup 236 are configured to support a weight at least equal to the apparatus. Therefore, ground maintenance personnel training on the wing mockup station 200 can practice working with weight loads approximately equal to the loads they would have to mount or remove from a payload pylon on a corresponding real aircraft wing.

Wing mockup station further comprises a nacelle pylon mockup 228 coupled to the wing mockup 214 and a nacelle mockup 230 coupled to the nacelle pylon mockup 228. The nacelle mockup 230 may be made from polyurethane (PU) foam. The nacelle pylon mockup 228 may comprise a combination of polyurethane foam parts and 3-D printed plastic parts (e.g., ABS) (see FIG. 7). A steel ground support structure 234 may be positioned under the nacelle mockup 230.

The flap track assemblies 222 and nacelle mockup 230 are positioned as per aircraft coordinates to simulate the actual aircraft training environment and provide necessary obstructions which the ground crew would encounter while working on the actual production aircraft.

Figure 4:
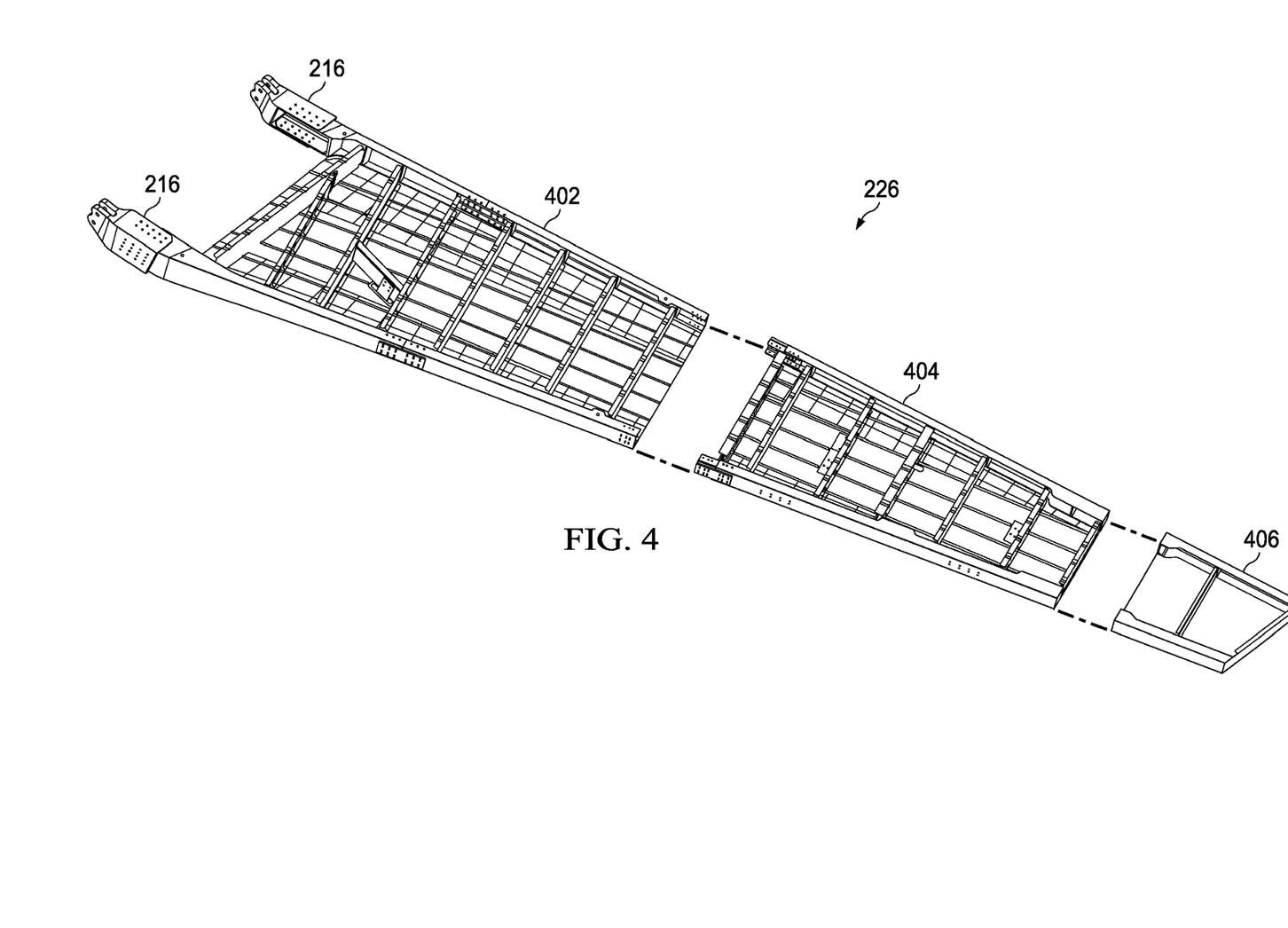
FIG. 4 depicts a diagram illustrating a center wing section in accordance with an illustrative embodiment.

FIG. 4 depicts a diagram illustrating a center wing section in accordance with an illustrative embodiment. FIG. 4 depicts a more detailed view of center wing section 226 in FIG. 2.

As shown in the present example, center wing section 226 may comprise a number of modules 402, 404, 406 that are combined together to form the center wing section. More or fewer numbers of modules may be used depending on the specific production aircraft wing is simulated by the mockup station.

Also shown more clearly in FIG. 4 are the double shear clevis fittings 216 that connect the wing mockup 214 to the horizontal steel beam 204 of the primary support structure. Clevis fittings 216 may hold double shear steel lugs from spar ends on the horizontal steel beam 204.

Figure 5:
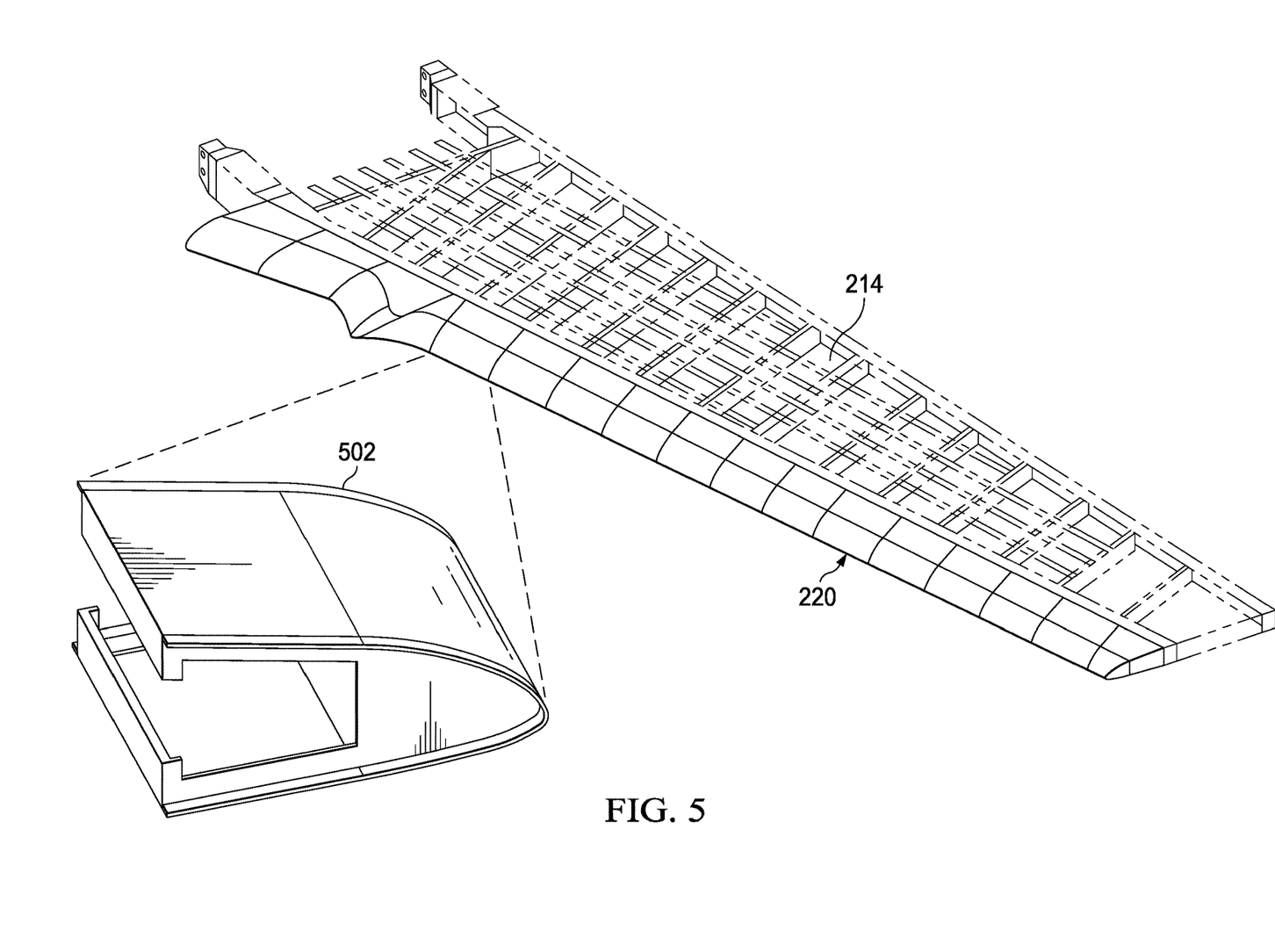
FIG. 5 depicts a diagram illustrating leading edge subassembly in accordance with an illustrating embodiment.

FIG. 5 depicts a diagram illustrating leading edge subassembly in accordance with an illustrating embodiment. FIG. 5 depicts a more detailed view of leading edge subassembly 220 in FIG. 2.

In the present example, the leading edge subassembly 220 comprises a number of additively manufactured pieces 502 using ABS plastics. The pieces 502 may be stacked over each other, allowing the pieces to slip over each other during structural deflection caused by loading and unloading the wing mockup 214.

Figure 6:
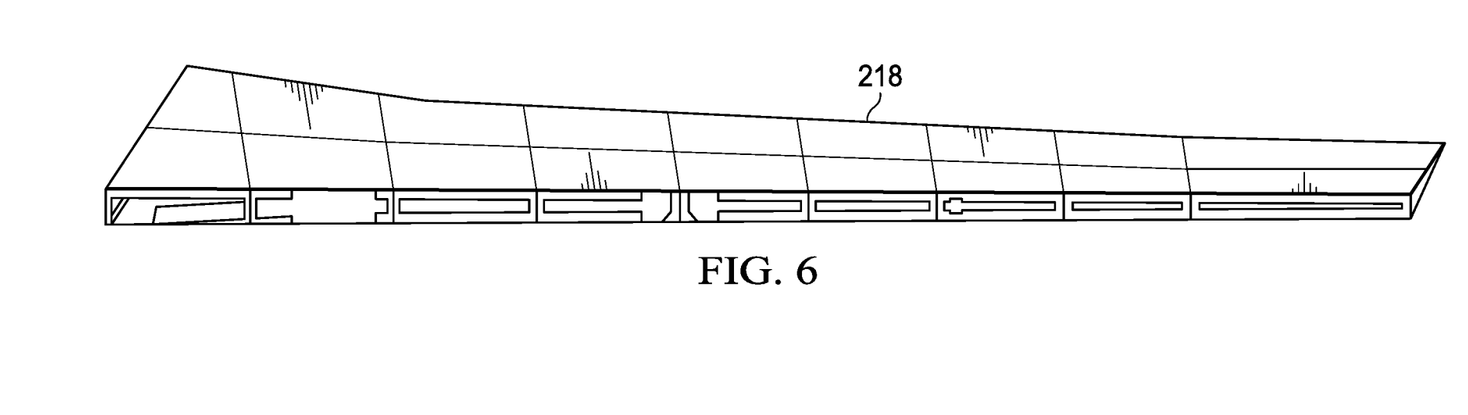
FIG. 6 depicts a diagram illustrating a wing trailing edge subassembly in accordance with an illustrative embodiment.

FIG. 6 depicts a diagram illustrating a wing trailing edge subassembly in accordance with an illustrative embodiment. FIG. 6 shows a more detailed view of the trailing edge subassembly 218 in FIG. 2.

Figure 7:
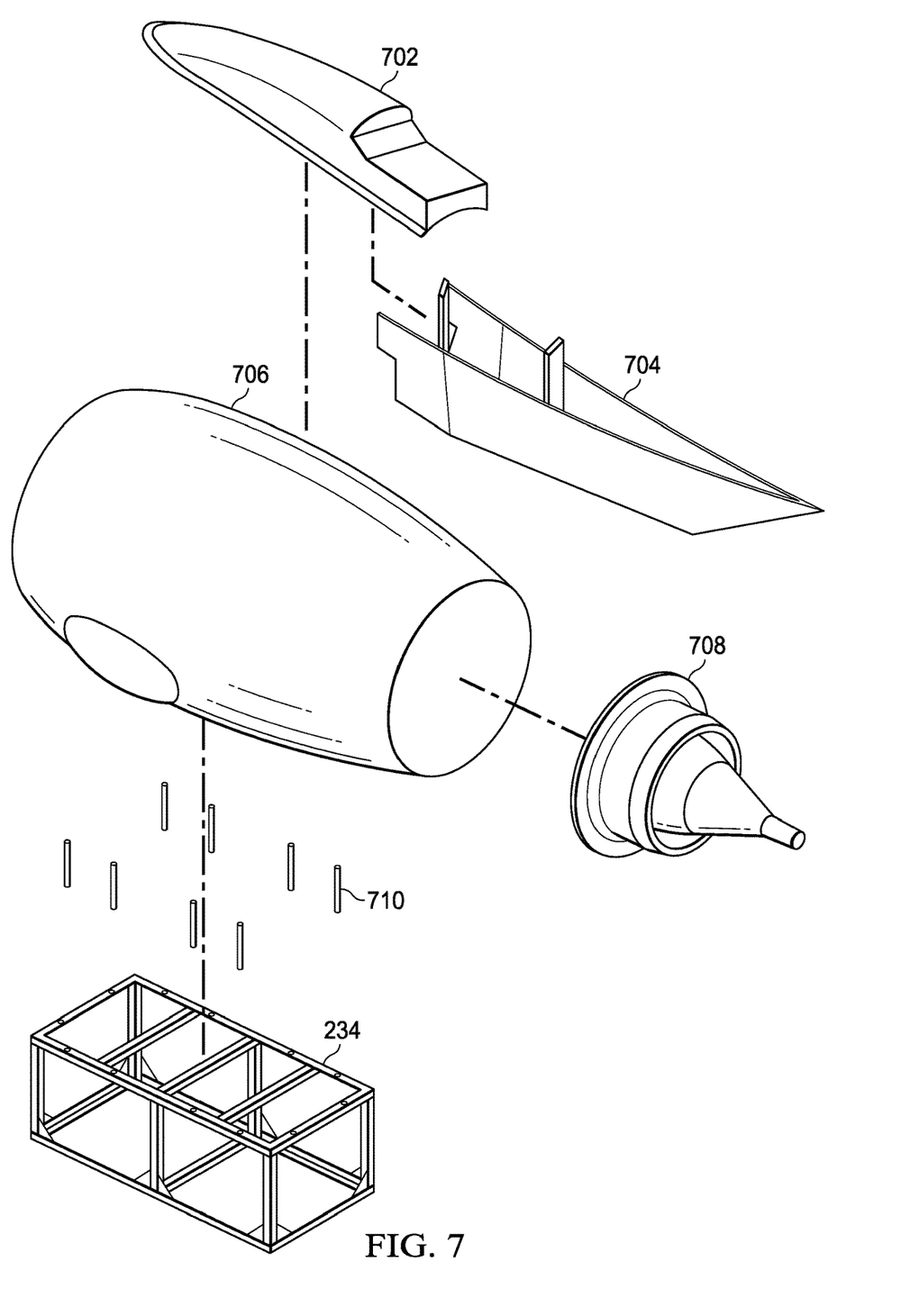
FIG. 7 depicts an exploded view diagram of a nacelle pylon mockup and nacelle mockup in accordance with an illustrative embodiment.

FIG. 7 depicts an exploded view diagram of a nacelle pylon mockup and nacelle mockup in accordance with an illustrative embodiment. FIG. 7 shows a more detailed view of the nacelle pylon mockup 228 and nacelle mockup 230 in FIG. 2.

In the present example, the nacelle pylon mockup 228 comprises a pylon hood 702 made from polyurethane foam and a pylon rear section 704 made from 3-D printed ABS plastic.

The nacelle mockup 230 comprises a main engine body 706 and rear engine section 708 both made of polyurethane foam. Metallic tubes 710 provide stability of the main engine body 706 on steel ground support structure 234.

Figure 8:
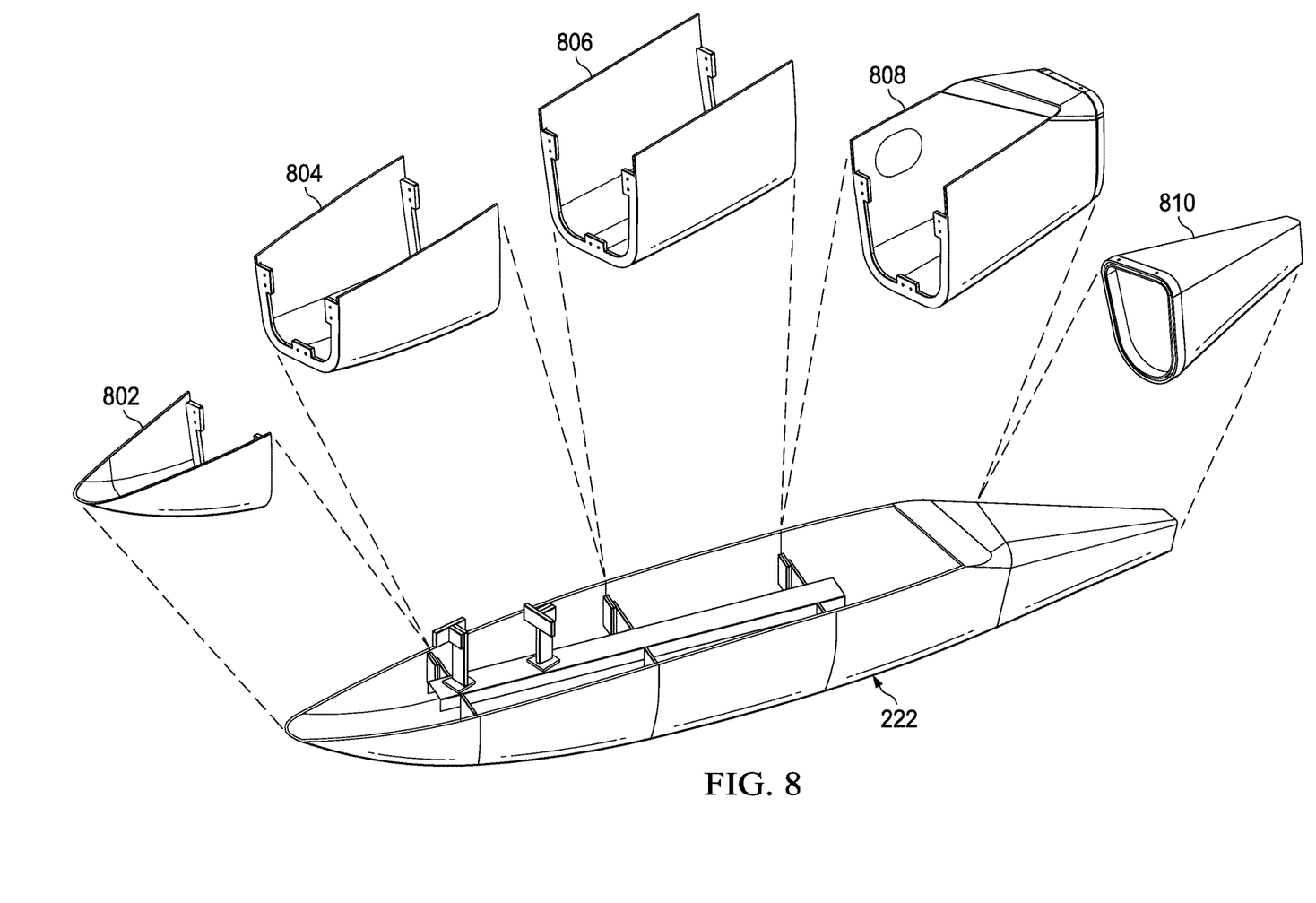
FIG. 8 depicts a diagram illustrating a flap track assembly in accordance with an illustrative embodiment.

FIG. 8 depicts a diagram illustrating a flap track assembly in accordance with an illustrative embodiment. FIG. 8 shows a more detailed view of flap track assembly 222 in FIG. 2.

In the present example, the flap track assembly comprises five pieces 802, 804, 806, 808, 810. More or fewer pieces may be used depending on the production aircraft simulated by the mockup station.

As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The block diagrams in the different depicted embodiments illustrate the architecture, functionality, and operation of some possible implementations of apparatuses and methods in an illustrative embodiment. In this regard, each block in the block diagrams may represent at least one of a module, a segment, a function.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A ground-based wing mockup station, comprising:
   a primary support structure removably coupled to a floor;
   a wing mockup of a production aircraft wing, the wing mockup coupled to the primary support structure, wherein the wing mockup comprises parts made of lighter materials than corresponding parts of the production aircraft wing;
   a secondary support structure configured to suspend the wing mockup over the floor from the primary support structure; and
   a payload pylon mockup coupled to the wing mockup, wherein the pylon mockup is configured to hold an apparatus, and wherein the primary support structure, secondary support structure, wing mockup, and payload pylon mockup are configured to support a weight at least equal to the apparatus.

2. The wing mockup station of claim 1, further comprising:
   a nacelle pylon mockup coupled to the wing mockup; and
   a nacelle mockup coupled to the nacelle pylon mockup.

3. The wing mockup station of claim 2, wherein the nacelle pylon mockup and nacelle mockup are made of polyurethane foam.

4. The wing mockup station of claim 2, wherein the nacelle pylon mockup comprises a number of additively manufactured pieces.

5. The wing mockup station of claim 2, further comprising a steel ground support structure positioned under the nacelle mockup.

6. The wing mockup station of claim 1, wherein the primary support structure comprises:
   two upright steel beams; and
   a horizontal steel beam connecting the upright steel beams.

7. The wing mockup station of claim 6, wherein the upright steel beams are fastened to the floor by removable anchor bolts.

8. The wing mockup station of claim 6, wherein the secondary support structure comprises a number of steel tension ropes connecting the upright steel beams to the wing mockup and connecting the upright steel beams and horizontal beam to the floor.

9. The wing mockup station of claim 6, wherein the wing mockup comprises:
   a center wing section made of aluminum;
   a trailing edge subassembly made of aluminum;
   a leading edge subassembly made of ABS plastics; and a number of double shear clevis fittings that connect a proximal end of the wing mockup to the horizontal steel beam.

10. The wing mockup station of claim 9, wherein the leading edge subassembly comprises a number of additively manufactured pieces.

11. The wing mockup station of claim 9, wherein the wing mockup further comprises a number of flap track assemblies made of aluminum.

12. The wing mockup station of claim 1, wherein the payload pylon mockup is made of machined aluminum.

13. An aircraft wing mockup training station, comprising:
   a support structure comprising steel beams configured to be removably connected to a floor;
   an aircraft wing mockup coupled to the support structure and suspended over the floor, wherein the aircraft wing mockup comprises an aluminum center wing section, an aluminum trailing edge subassembly, and an ABS plastic leading edge subassembly;
   a polyurethane foam nacelle pylon mockup coupled to the aircraft wing mockup;
   a polyurethane foam nacelle mockup coupled to the nacelle pylon mockup; and
   an aluminum payload pylon mockup coupled to the aircraft wing mockup and configured to hold a device, wherein the support structure, aircraft wing mockup, and payload pylon mockup are configured to hold a weight load at least equal to the device.

14. The aircraft wing mockup training station of claim 13, wherein the support structure comprises:
   two upright steel beams fastened to the floor by removable anchor bolts; and
   a horizontal steel beam connecting the upright steel beams.

15. The aircraft wing mockup training station of claim 14, further comprising a number of steel tension ropes connecting the upright steel beams to the wing mockup and connecting the upright steel beams and horizontal beam to the floor.

16. The aircraft wing mockup training station of claim 14, wherein the aircraft wing mockup further comprises:
   a number of flap track assemblies made of aluminum; and
   a number of double shear clevis fittings that connect a proximal end of the wing mockup to the horizontal steel beam.

17. The aircraft wing mockup training station of claim 13, wherein the leading edge subassembly comprises a number of additively manufactured pieces.

18. The aircraft wing mockup training station of claim 13, wherein the nacelle pylon mockup comprises a number of additively manufactured pieces.

19. The aircraft wing mockup training station of claim 13, further comprising a steel ground support structure positioned under the nacelle mockup.

20. A ground-based aircraft wing mockup station, comprising:
   a support structure configured to be removably coupled to a floor;
   a wing mockup of a production aircraft wing coupled to the support structure and suspended over the floor, wherein the wing mockup comprises parts made of lighter materials than corresponding parts of the production aircraft wing, and wherein the parts comprising the wing mockup are a subset of the corresponding parts of the production aircraft wing;
   a nacelle pylon mockup coupled to the wing mockup;
   a nacelle mockup mounted to the nacelle pylon mockup, wherein the nacelle mockup is made of lighter material than a real nacelle; and
   a payload pylon mockup coupled to the wing mockup, wherein the payload pylon mockup is configured to hold specified equipment, and wherein the support structure, the wing mockup, and the payload pylon mockup are configured to hold a weight load at least equal to the specified equipment.

\* \* \* \* \*